US00RE36454E

United States Patent [19]

Ball et al.

[11] E Patent Number: Re. 36,454

[45] Reissued Date of Patent: Dec. 21, 1999

[54] ELECTRICAL PROPULSION SYSTEMS FOR A VEHICLE

[75] Inventors: Larry Gene Ball, Snow Camp, N.C.; Patrick Charles Koehl, Ft. Wayne, Ind.

[73] Assignee: General Electric Company, Schenectady, N.Y.

[21] Appl. No.: 08/891,255

[22] Filed: Jul. 10, 1997

Related U.S. Patent Documents

Reissue of:

[64] Patent No.: 5,565,760
Issued: Oct. 15, 1996
Appl. No.: 08/333,550
Filed: Nov. 2, 1994

[51] Int. Cl.[6] ..... H02P 5/16

[52] U.S. Cl. ..... 322/23; 318/373; 318/493

[58] Field of Search ..... 322/23, 28, 39; 318/52, 53, 63, 139, 269, 301, 373, 375, 382

[56] References Cited

U.S. PATENT DOCUMENTS

| | | | |
|---|---|---|---|
| 3,662,227 | 5/1972 | Morrison et al. | 317/135 |
| 3,689,818 | 9/1972 | Morton et al. | 318/478 |
| 3,753,077 | 8/1973 | Anderson et al. | 321/45 C |
| 3,760,246 | 9/1973 | Gurwicz et al. | 318/52 |
| 3,764,870 | 10/1973 | Morton et al. | 318/139 |
| 3,811,080 | 5/1974 | Morton et al. | 318/341 |
| 3,819,997 | 6/1974 | Morton et al. | 318/258 |
| 3,826,959 | 7/1974 | Anderson | 318/139 |
| 3,826,962 | 7/1974 | Morton et al. | 318/376 |
| 3,855,512 | 12/1974 | Konrad | 318/366 |
| 3,868,554 | 2/1975 | Konrad | 318/434 |
| 3,914,671 | 10/1975 | Morton et al. | 318/139 |
| 3,927,357 | 12/1975 | Konrad | 318/139 |
| 3,958,163 | 5/1976 | Clark | 318/373 |
| 3,968,414 | 7/1976 | Konrad | 318/341 |

FOREIGN PATENT DOCUMENTS

| | | |
|---|---|---|
| 54-951112 | 4/1979 | Japan . |
| 58-029301 | 2/1983 | Japan . |
| 59-099906 | 8/1984 | Japan . |
| 59-191404 | 10/1984 | Japan . |
| 61-092104 | 5/1986 | Japan . |
| 61-167302 | 7/1986 | Japan . |
| 2070206 | 3/1990 | Japan . |
| 2290107 | 11/1990 | Japan . |

(List continued on next page.)

*Primary Examiner*—Nestor Ramirez
*Assistant Examiner*—Nicholas Ponomarenko
*Attorney, Agent, or Firm*—Wayne O. Traynham; James H. Beusse

[57] ABSTRACT

A method and apparatus for preventing overspeed of an electrically powered [golf car] *vehicle* having a shunt wound direct current electric motor with an armature winding and a field winding serially connected to respective switching devices and to a source of on-board direct current electric power. The [golf car] *vehicle* includes a control adapted and connected to regulate the current in each of the armature and field windings for controlling speed in response to an operator's command. The [golf car] *vehicle* incorporates overspeed detect sensing the magnitude of current in each of the armature winding and the field winding and detecting when the current in the armature winding reverses direction. The magnitude of the armature winding current upon such reversal is compared to a preselected value and an overspeed signal generated when the reverse current magnitude exceeds the preselected value. The field current is then controlled, in response to the overspeed signal, to limit the speed of the [golf car] *vehicle* to inhibit the overspeed condition. Additionally, the voltage at the motor armature winding is monitored during a time period when the motor is in a non-energized condition and a motion signal indicative of motor armature rotation is provided upon detection of a motor armature winding voltage. The motor field winding is energized, in response to the motion signal, with a voltage of a polarity for generating a field current to cause the motor to act as an electric current generator and the current generated by the motor armature is circulated through a plugging diode and into the motor armature for electrically retarding rotation of the motor armature by plug braking.

20 Claims, 4 Drawing Sheets

U.S. PATENT DOCUMENTS

| | | | |
|---|---|---|---|
| 4,001,688 | 1/1977 | Marwell et al. | 324/182 |
| 4,006,415 | 2/1977 | Finger | 324/182 |
| 4,012,681 | 3/1977 | Finger et al. | 320/14 |
| 4,017,724 | 4/1977 | Finger | 235/151.31 |
| 4,114,076 | 9/1978 | Teranishi et al. | 318/421 |
| 4,119,898 | 10/1978 | Morton et al. | 318/341 |
| 4,132,934 | 1/1979 | Morton et al. | 318/382 |
| 4,139,896 | 2/1979 | Finger | 364/829 |
| 4,186,339 | 1/1980 | Finger | 324/142 |
| 4,192,009 | 3/1980 | Finger | 364/829 |
| 4,193,026 | 3/1980 | Finger et al. | 324/428 |
| 4,288,734 | 9/1981 | Finger | 320/48 |
| 4,336,484 | 6/1982 | Marinko | 318/696 |
| 4,370,636 | 1/1983 | VanPatten | 335/132 |
| 4,388,618 | 6/1983 | Finger | 340/636 |
| 4,408,147 | 10/1983 | Gabel | 318/493 |
| 4,414,479 | 11/1983 | Foley | 307/253 |
| 4,423,363 | 12/1983 | Clark et al. | 318/375 |
| 4,427,930 | 1/1984 | Berman et al. | 318/301 |
| 4,434,450 | 2/1984 | Gareis | 361/152 |
| 4,442,351 | 4/1984 | Pfeifer et al. | 250/237 |
| 4,443,744 | 4/1984 | Konrad | 318/269 |
| 4,449,080 | 5/1984 | Konrad et al. | 318/139 |
| 4,450,427 | 5/1984 | Gareis | 338/32 H |
| 4,454,503 | 6/1984 | Konrad | 340/648 |
| 4,460,870 | 7/1984 | Finger | 324/429 |
| 4,461,988 | 7/1984 | Plunkett | 318/802 |
| 4,468,599 | 8/1984 | Berman et al. | 318/362 |
| 4,479,080 | 10/1984 | Lambert | 318/373 |
| 4,500,818 | 2/1985 | Konrad et al. | 318/52 |
| 4,514,694 | 4/1985 | Finger | 324/429 |
| 4,520,299 | 5/1985 | Konrad | 318/587 |
| 4,560,937 | 12/1985 | Finger | 324/433 |
| 4,626,750 | 12/1986 | Post | 318/139 |
| 4,691,148 | 9/1987 | Nicholls et al. | 318/12 |
| 4,730,151 | 3/1988 | Florey et al. | 318/376 |
| 4,801,855 | 1/1989 | Nohmi et al. | 318/338 |
| 5,247,253 | 9/1993 | Bowman | 324/207.12 |
| 5,261,025 | 11/1993 | Post et al. | 358/811 |
| 5,283,470 | 2/1994 | Bohannan | 180/13 |
| 5,309,073 | 5/1994 | Kaneko et al. | 318/500 |
| 5,340,202 | 8/1994 | Day | 303/19 |

ELECTRICAL PROPULSION SYSTEMS FOR A VEHICLE

Matter enclosed in heavy brackets [ ] appears in the original patent but forms no part of this reissue specification; matter printed in italics indicates the additions made by reissue.

BACKGROUND OF THE INVENTION

The present invention is directed to a golf car having an electric propulsion system and, more particularly, to a golf car incorporating a shunt wound separately excited direct current electric motor propulsion system.

Electrically propelled vehicles are in use in numerous applications. For example, fixed rail transit vehicles and locomotives are typically propelled by electric motors as are various types of off-highway vehicles in the mining industry. Electric power for these types of vehicles is provided by external sources or by on-board engines and generator sets. Thus, the range of velocity and horsepower developed by these vehicles is controlled to a large extent by a virtually unlimited power source which permits use of large series wound direct current (DC) motors to provide tractive effort.

In some classes of vehicles, such as, for example, golf cars, the power source is limited to batteries because the vehicle must be kept relatively small while permitting maximum mobility. Historically, it has been the general practice to equip electrically powered golf ears with series wound DC electric motors. While such series wound motors provide satisfactory operating characteristics on generally flat golf courses, any course which requires that the vehicle be driven over hilly terrain has typically relied on internal combustion engine powered golf cars since the characteristics of the series wound DC motor made the electrically propelled golf cars undesirable on such courses. Referring briefly to FIG. 1, there is shown a typical characteristic curve for a series wound DC motor which shows that the motor produces its maximum torque at very low speeds but that torque is inversely proportional to vehicle speed. Accordingly, as a golf car attempts to climb a relatively steep grade, speed rapidly falls off as the required torque increases. Conventional golf cars using series wound DC motors will typically stall on a hill grade of about 40%.

It is known that shunt wound DC electric motors using separately excited armature winding and field winding controls can provide motor operating characteristics that have certain advantages over the series wound DC motor. In particular, the point at which speed begins to decrease in response to increased torque commands can be shifted considerably on the speed torque curve so as to improve the performance of a vehicle equipped with a shunt wound separately excited motor. However, controls for such motors have typically been too expensive to use on low end applications such as golf cars. In addition, the shunt wound motor has had other concerns such as the inability to provide retarding torque as the vehicle is driven down a hill. In particular, if the shunt wound motor is applied to a golf car and is proceeding down a hill of about 30 to 40% grade, the velocity of the vehicle can exceed the mechanical maximum velocity of the shunt wound motor causing the motor to mechanically fail and disable the vehicle. Furthermore, such high speeds in a golf car can be dangerous for passengers of that car. Still another disadvantage historically associated with the use of shunt wound motors in golf cars is the possibility of a runaway unattended golf car. For example, if the golf car is parked on or near the crest of a hill without setting the hill brake, the golf car could begin to roll after the passengers have left the car and accelerate to speeds which could destroy the mechanical drive system of the car or damage anything in the path of the golf car.

SUMMARY OF THE INVENTION

Among the several objects of the present invention may be noted the provision of an electrically propelled golf car using a shunt wound separately excited DC electric motor which overcomes the above and other disadvantages of the prior art; the provision of a control system for a golf car with hill sensing diagnostics which automatically senses overspeed in an occupied car and implements regenerative braking to limit speed; the provision of a control system for a golf car which senses runaway of an unattended car and implements severe braking; the provision of a control algorithm for a golf car which is adjustable to achieve desired torque/speed performance of the car; the provision of a golf car control system which automatically senses overvoltage during electrical regenerative braking and limits voltage to prevent control damage; and the provision of a golf car including detection of minimum field current prior to application of armature current to prevent armature damage. In an illustrative embodiment, the present invention incorporates a shunt wound DC electric motor into a golf car drive system in which the motor includes an armature winding and a separately excited field winding. The motor is connected to a propulsion system which includes a pulse width modulated switching device connected between the armature winding and a battery pack on the vehicle and a separate pulse width modulated field control circuit also connecting the field winding to the onboard battery pack. During normal propulsion operation of the golf car, depression of an accelerator on the car initially applies a fixed amount of field current to the motor field winding and allows the armature current to increase up to a first predetermined value. As additional speed or torque is demanded of the motor by driving the golf car up a hill, for example, the control system begins to modulate the field current in a preselected ratio to armature current. Typically, the field current would be allowed to increase up to some maximum value at the same time that the armature current reaches its maximum value. The propulsion characteristics are selected so that the golf ear will maintain a fairly constant speed until the armature current reaches the first preselected value. Thereafter, any demand for additional torque as a consequence of increased loading on the golf car will result in an allowable increase in field current and corresponding increase in armature current to produce the torque necessary to hold or to attempt to hold vehicle speed at the constant value. More importantly, the control system is adapted to sense overspeed of the electric motor and put the system into an automatic regenerative braking mode to produce retarding torque and restrict any further increase in motor speed. If the vehicle operator releases the accelerator in response to the vehicle proceeding down a hill at what is perceived to be an increased speed, the control system will energize the motor field winding for a specified time while testing for an overspeed condition. If the overspeed condition is detected, the propulsion system will automatically enter the regenerative braking mode even though the operator has not actuated the accelerator. The advantage of this downhill sensing system is to prevent the vehicle from overspeeding as it proceeds down a hill but at the same time will allow the vehicle to coast on a level surface when the accelerator is released since the overspeed condition will not occur unless the vehicle accelerates due to gravitational forces on a downhill slope. The system further includes detectors for sensing motion of the vehicle from a parked condition by detecting regenerative voltage at the motor armature winding caused by rotation of the motor armature as a vehicle begins to move. The system relies on residual magnetism in the motor casing to provide sufficient counter electromotive force (CEMF) to be detected by a voltage sensor at the motor armature terminals. If voltage is detected and there is no armature or field current, the system will sense the polarity of the motor voltage, interrogate the last direction in which the golf car was driven and will then automatically generate field current in a direction to cause armature current to flow in a direction to cause the motor to act as a generator. The regenerated current is then circulated through a plugging diode and causes the motor to plug sufficiently to limit the speed of the golf car to a very low value, such as, for example, two miles per hour.

The propulsion system also includes armature voltage monitoring to prevent armature voltage from exceeding a selected maximum value during regenerative braking to thereby protect the control electronics from being damaged by an excess voltage. Still further, the system incorporates a field current detect circuit which prevents application of armature current until field current reaches a minimum value in order to protect the armature from an over-current condition.

BRIEF DESCRIPTION OF THE DRAWINGS

For a better understanding of the present invention, references may be had to the following detailed description taken in conjunction with the accompanying drawings in which.

DETAILED DESCRIPTION OF THE INVENTION

Figure 1:
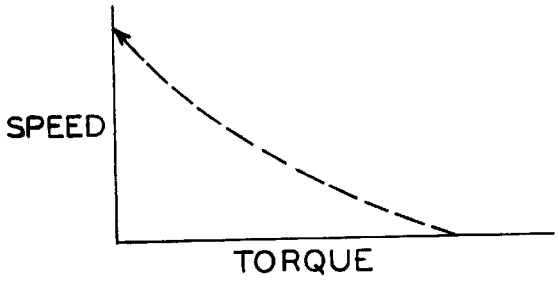
FIG. 1 PRIOR ART
FIG. 1 is a characteristic torque/speed curve for a series wound DC electric motor.
Figure 2:
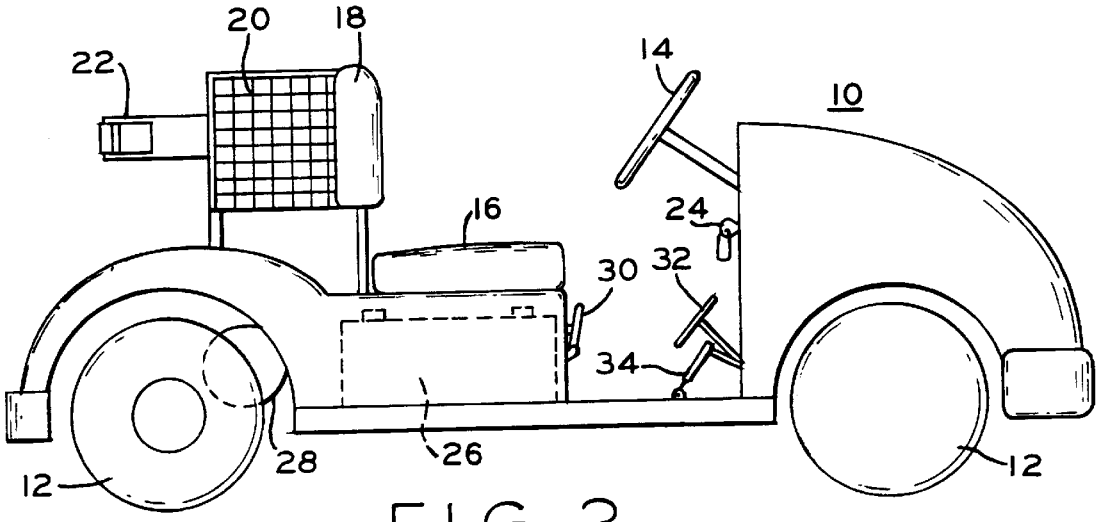
FIG. 2 PRIOR ART
FIG. 2 is a simplified illustration of a conventional golf car with which the present invention may be used.

Referring now to FIG. 2, there is shown a simplified illustration of a golf car 10 in accordance with the present invention. The golf car 10 incorporates conventional features such as front and rear wheels 12, steering wheel 14, a seat 16 and a seat back 18. A basket 20 is located behind seat back 18 and a conventional golf bag retaining mechanism 22 is located aft of basket 20. The car 10 includes a key switch 24 which is coupled to a propulsion control and allows 65 power to be supplied from a battery 26 to a motor 28. The golf car also includes a forward/reverse switch 30 which can be set to cause the vehicle to proceed in either a forward or a reverse direction. The golf car further includes a brake pedal 32 and an accelerator pedal 34. The accelerator pedal is connected to an accelerator position sensor (not shown) which provides signals to the propulsion system for controlling the motor 28 by regulating the amount of power supplied from battery 26 to motor 28. An example of one form of an accelerator position sensor is shown in U.S. Pat. No. 4,442,351 although it is expected that a low-cost accelerator for a golf car may use a simple rheostat to detect pedal position.

Figure 3:
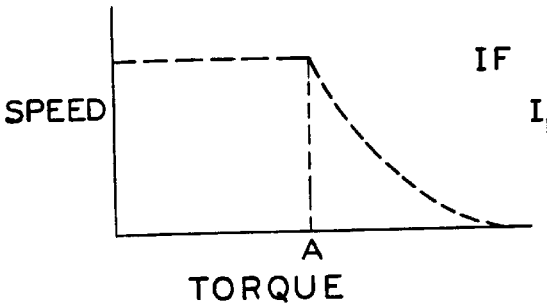
FIG. 3 PRIOR ART
FIG. 3 is a speed/torque characteristic for a shunt wound electric motor.

In operation, a driver seated on seat 16 will first engage switch 30 to select either a forward or reverse direction of motion for the golf car 10. Thereafter, it is desirable to turn key 24 to an on position and to depress accelerator 34 to cause the golf car to begin moving. Generally, the golf cars are set to proceed at some maximum low speed such as, for example, 14.5 miles per hour, with the accelerator pedal 34 fully depressed and the golf car proceeding on level ground. If the car 10 encounters a hill, the propulsion system senses the increased torque required to maintain the maximum speed and adjusts the propulsion system to increase both armature current and field current in order to cause the motor to produce additional torque for maintaining the maximum allowable speed of the golf car. Referring briefly to FIG. 3, there is shown an example of a conventional speed torque curve for a separately excited shunt motor of the type utilized as motor 28 in golf car 10. Note that the speed can be maintained at essentially a constant value from zero torque out to a preselected torque value A which is normally limited to a motor stability point although, as will be explained hereinafter, the point A can be adjusted to a value of torque below the motor stability point. For torque values higher than point A, the characteristics of the shunt wound motor are similar to the series motor in that speed drops off or decreases as torque increases. The motor stability point is established by the motor manufacturer and is a function of the size, number of windings and other construction factors of the motor itself. The motor stability point is generally defined as the ratio of the number of rated field ampere turns divided by the number of rated armature ampere turns. For one exemplary motor suitable for use in the golf car 10, the motor stability point A is set at a ratio of about 0.7.

Figure 4:
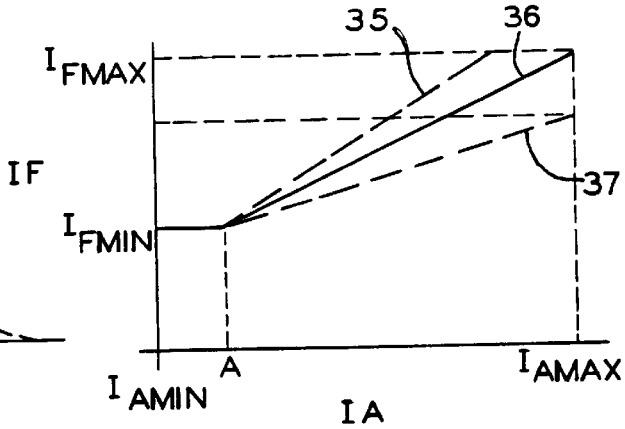
FIG. 4 is a field current/armature current graph for a motor operated in accordance with the present invention.

Referring to FIG. 4, there is shown a graph of field current $I_F$ as a function of armature current $I_A$ for a shunt motor operated in accordance with the present invention. Point A on the graph of FIG. 4 corresponds to point A on the graph of FIG. 3. With minimum field current $I_{FMIN}$, speed is held constant under increasing load by increasing armature current $I_A$ until operation reaches point A. An increase in torque above point A, such as may be required for hill climbing, requires a concomitant increase in both $I_F$ and $I_A$ which increases torque but decreases motor speed. It will be noted that a minimum field current exists from the minimum armature current up to the motor stability point A. Above the motor stability point, the field current is increased to thereby increase torque of the motor and at the same time the armature current is allowed to increase in accordance with a predetermined ratio between the field current and armature current. Various values of the ratio can be set in order to obtain different characteristics from the shunt motor. For example, by setting the ratio as indicated by the solid line 36, one can obtain a preferred operating characteristic over a course which has an average amount of hilliness without any excessive hill climbing required. However, if the course has rather steep hills, it may be desirable to increase the amount of torque capability of the or by increasing the field current along the line 35. This gives greater torque but sacrifices speed. On courses which are more flat, it may be desirable to provide less torque but higher speed as indicated by the phantom line 37. Phantom line 37 indicates a lower peak maximum field current with a higher ratio of armature current therefore giving greater speed with less torque. The system for establishing these two lines may be implemented in either an analog circuit or may be stored in a logic table in memory in a computer control system. The curve is determined from the basic motor torque equation as follows:

$$T=F\times I_F\times I_A$$

It will be appreciated that for any given motor the value of K is a constant and the value of armature current as a function of field current can be determined for any fixed value of desired torque T. The $I_F/I_A$ graph of FIG. 4 is not to scale. For one exemplary motor 28, $I_{FMIN}$ iS set at 4 amps, $I_{FMAX}$ is 30 amps, motor stability point A occurs at $I_A$ equal to 60 amps and $I_{AMAX}$ is at 300 amps.

Figure 5:
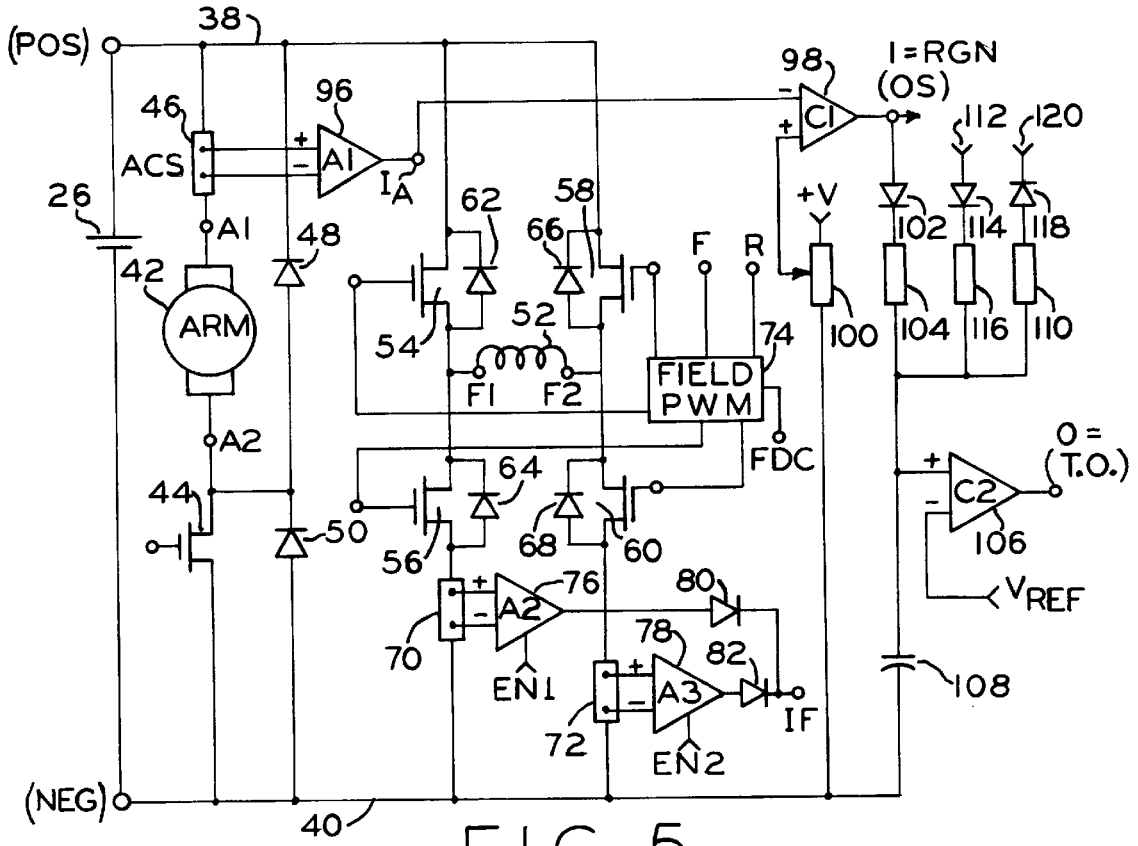
FIG. 5 is a simplified schematic diagram of a power circuit for a shunt motor for a golf car in accordance with the present invention.

Turning now to FIG. 5, there is shown a simplified schematic representation of a power system for use with the motor 28 in the golf car 10 to achieve the performance characteristics set forth in FIGS. 3 and 4. The battery 26 is coupled between a pair of relatively positive and negative DC power buses 38 and 40, respectively. An armature winding 42 of motor 28 is connected by means of a switching device 44 between the buses 38 and 40. The switching device 44 may be, for example, a MOSFET device of a type well known in the art. A current sensor 46 is connected to the line between bus 38 and an upper terminal A1 of armature winding 42. A lower terminal A2 of armature winding 42 is connected through a flyback or free wheeling diode 48 to the positive terminal 38. The diode D1 is used to conduct current through the inductive circuit including the armature 42 when the switching device 44 is in a non-conducting state or when motor terminal A2 is relatively more positive (higher voltage) than the voltage at bus 38, the latter event occurring when the motor is in a plugging mode. The diode 48 is sometimes referred to as a plug diode. The terminal A2 is also connected to a regeneration diode which is coupled to the negative power bus 40. Note that the polarity of the diode 48 and diode 50 are such to conduct current from the negative bus 40 to the positive bus 38 so that in normal operation, both diodes 48 and 50 are reverse biased.

The motor 28 also includes a field winding 52 connected in a common H-bridge arrangement of a type well known in the art. The H-bridge arrangement includes a first pair of switching devices 54 and 56 serially connected between bus 38 and bus 40 and a second pair of serially connected switching devices 58 and 60 connected essentially in parallel with the first switching devices 54 and 56. The junction intermediate the pair of switching devices 54 and 56 is connected to a first field winding terminal F1 and the junction intermediate devices 58 and 60 is connected to a second terminal F2 of winding 52. Each of the devices 54–60 are bypassed by a respective one of a plurality of diodes 62–68. The diodes 62–68 provide a flyback current path when the switching devices are switched to a non-conducting state. More particularly, the switches 54 and 58 are operated in a switching mode, such as a pulse width modulation (PWM) mode, to regulate field current and the diodes 62–68 provide a current path for the inductive field current when the devices 54, 58 switch from a conductive to non-conductive state. Field current sensors 70 and 72 are connected in each of the respective lines between the lowermost switching devices 56 and 60 and the negative power bus 40. The devices 54–60 are preferably MOSFET switching devices of a type well known in the art.

Before describing the method of controlling current in the armature and field windings 42 and 52, it will first be noted that when switch 44 is in a conducting mode, battery voltage is applied directly across the armature terminals A1–A2 to establish a current through the armature winding 42. If the switch 44 is gated into an off condition, the inductive to reactance of the armature winding causes a current to continue to flow from terminal A2 through diode 48 and back to the power source if the armature voltage is higher than the voltage of the battery 26. Otherwise, the current flows in a closed loop through diode 48 and back into terminal A1 through armature winding 42 in a circulating path. If the armature voltage is reversed so that current flow through armature winding 42 is from terminal A2 to terminal A1, the motor is in a regenerative braking mode and current flows through diode 50 to terminal A2 through the winding 42 and to the positive bus 38 where it is fed back to battery 26. The control system functions to assure that the voltage generated by the armature in a regenerative braking mode is sufficiently high to allow current to flow back to battery 26. In the field winding circuit, the magnitude of field current is controlled by the two upper switching devices 54 and 58. If conventional current through field 52 flows from terminal F1 to terminal F2, the motor will be propelled in a first direction which can be assumed to be a forward direction. In this mode, the switching device 60 is fully conductive and the switching device 54 is modulated to control the magnitude of field current. Devices 58 and 56 are non-conductive. When device 54 is turned off, the inductance of the field 52 causes current to continue to flow via diodes 64 and 66. In the reverse direction, current flows from terminal F2 to 35 terminal F1 with switching device 56 being fully conductive and device 58 being modulated to control the average value of field current. When device 58 switches to an off state, current circulates through diodes 60 and 62 from bus 40 to bus 38. The devices 54–60 are controlled by a field control pulse width modulating (PWM) device 74 of a type well known in the art. For example, the device 74 may be a Harris Corporation type 4081 H-bridge driver circuit. The driver circuit 74 has four outputs, one to each of the switching devices 54–60. It receives a field duty cycle signal (FDC) which determines the time ratio control of the switching devices 54 and 58 to set the magnitude of field current. Inputs F and R determine forward and reverse directions and establish which of the devices 54–60 will be conductive. The FDC input is an oscillator input which sets the time ratio so control of the devices 54 and 58. The FDC input is developed from the $I_F$ or field current signals obtained from field current sensors 70 and 72 and from the motor armature current sensor 46 in a manner to be described with reference to FIG. 10. The field current sensors 70 and 72 are each connected to respective ones of the amplifiers 76 and 78. The outputs of amplifiers 76 and 78 are coupled through corresponding diodes 80 and 82, which diodes 80 and 82 function as an OR circuit so that the output $I_F$ is the highest one of the signals from the sensors 70 and 72. The devices 56 and 60 are not modulated so that the field current signals from sensors 70 and 72 are not chopped.

Figure 6:
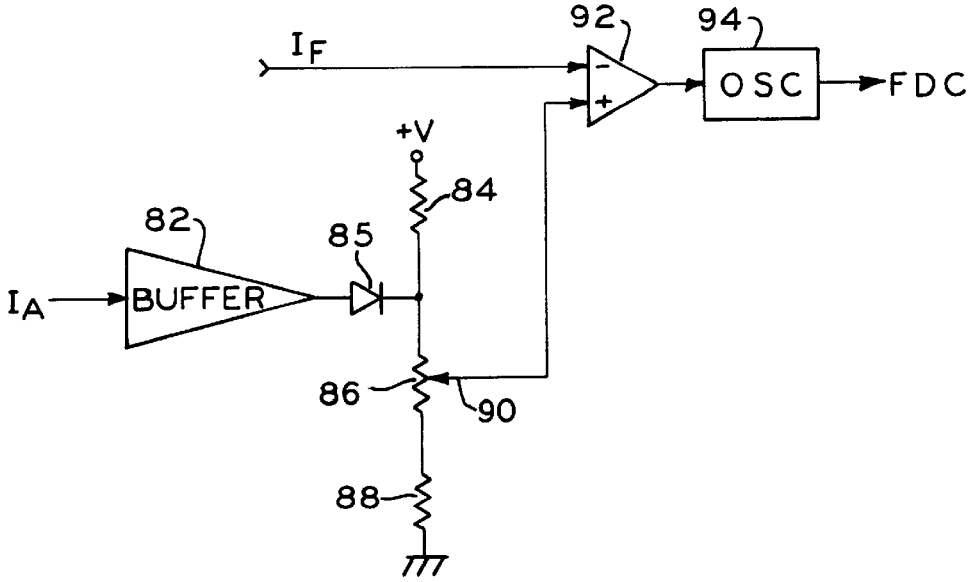
FIG. 6 is a simplified schematic of a portion of a control system for use with the circuit of FIG. 5.

Referring briefly to FIG. 6, there is shown a simplified schematic representation of how the FDC signal can be developed from the $I_A$ and $I_F$ signals for normal motoring operation of golf car 10. The signal $I_A$ representing the armature current is fed through a buffer 82 and then through a diode 83 and into a voltage divider comprising the series connected resistors 84, 86 and 88 connected between a positive voltage source $V^+$ and a reference potential or ground. The resistance 86 is a variable resistance having a tap 90 which allows the percentage of voltage fed forward from the output of buffer 82 to be set at a desired ratio. The signal from tap 90 is coupled into one input terminal of an amplifier 92 with a second input terminal of amplifier 92 receiving the $I_F$ signal discussed above. The output of amplifier 92 is the $I_F$ signal modified by the value of the $I_A$ signal. More particularly, the $I_F$ signal is now a function of to the $I_A$ signal for values of $I_F$ exceeding $I_{FMIN}$ or for values of $I_A$ exceeding the value at the motor stability point. Below the motor stability point, the diode 85 is reverse biased so that $I_A$ does not affect the value of $I_F$. The resultant signal is coupled to an oscillator 94 which provides the FDC output signal that is coupled to the field current regulator 74. In this manner, the magnitude of field current above the motor stability point A becomes a function of the magnitude of armature current.

Returning again to FIG. 5, one of the primary functions of the motor propulsion system is to be able to detect overspeed conditions and adjust the values of armature and field current in such a manner as to prevent the vehicle from exceeding an overspeed limit. To achieve this function, the magnitude and polarity of armature current is monitored by amplifier 96 connected to the terminals of the current sensor 46. During normal operation, motor terminal A1 is positive with respect to terminal A2 and current flows from bus 38 through armature current sensor (ACS) 46, armature 42 and device 44 to bus 40. During an overspeed condition, the armature will run or rotate at a speed higher than the commanded speed (being driven by rotation of wheels 12 as the vehicle rolls down a hill) and will therefore act as a generator with terminal A1 becoming more positive than bus 38. Armature current $I_A$ will reverse direction and the resulting regenerative current will flow through the diode SO, through armature 42 and current sensor 46 in a reverse direction. When this happens, the polarity of voltage applied to amplifier 96 is reversed causing its output to switch to a reverse polarity. The output of amplifier 96 is coupled to one input of a second comparator 98. A second input of comparator 98 is coupled to an adjustable tap on a potentiometer 100. The potentiometer 100 allows the voltage on the second input of amplifier 98 to be set at a desired value. In essence, potentiometer 100 sets the overspeed trip point. When the voltage on the first input terminal of amplifier 98 exceeds the voltage set by potentiometer 100, amplifier 98 will change states and provide an overspeed (OS) output signal which, in the illustrative embodiment, is a logic 1 and is interpreted as a call for regenerative (RGN) braking, i.e., i=RGN. For example, the motor design contemplated for a conventional golf car requires a minimum field current of about four amps to achieve a desired level running top speed of about 14.5 miles per hour. At this current level, the motor will produce approximately 10 amps of regeneration current at 4000 RPM, which corresponds to approximately 17 miles per hour and can only be achieved while the vehicle is running down an incline. When 10 amps of regeneration current is detected by the control system, i.e., by comparison of the output of amplifier 96 with the value set by potentiometer 100, an overspeed signal is produced to increase field current from the nominal 4 amps to about 15 to 25 amps. This resultant increase in field current will cause the motor to retard acceleration of the vehicle and prevent the motor RPM from increasing further, i.e., operation of the motor transitions into the region above point A of FIG. 3 where the higher generated torque in a reverse direction reduces speed.

The golf car control system has to detect different modes of operation in order to provide an acceptable response. For example, the car may be proceeding down a hill with the car operator holding the accelerator in a fully or partially depressed position. Under this condition, the system should initiate regenerative braking when the car speed reaches a preselected overspeed limit. Another condition may be that the car has been parked on a hill and the brake releases allowing the car to run away. In this condition, the accelerator is not depressed and the car should initiate plug braking to quickly limit speed to a much slower second overspeed limit. Another condition occurs if the operator proceeds downhill to an overspeed condition in which regenerative braking is initiated and then releases the accelerator. However, the system should not switch from the first limit to the second limit merely because the operator released the accelerator after the car has already entered regenerative braking. Still another condition exists in which the vehicle starts downhill and the operator releases the accelerator before overspeed occurs. In this condition, it is desirable to allow the car to accelerate to the first overspeed limit and then initiate regenerative braking. In general, in an occupied golf car it is desirable to limit car speed by regenerative braking to about 16–17 MPH whereas in an unoccupied, runaway car it is desirable to initiate plug braking and limit car speed to about 2–3 MPH.

One method of achieving these desirable features is to sense car overspeed and then determine the car operating conditions, for example, whether a forward or reverse direction is selected and whether the accelerator is actuated. Further, it may also be necessary to know if the accelerator has been actuated since the last time the car was driven in order to determine whether to implement plug braking at the lowest speed limit or to implement regenerative braking at the higher speed limit.

In one implementation of a control system, regenerative braking is implemented if the system detects an overspeed condition within a predetermined time, e.g., 20 seconds, after the accelerator is released. Referring again to FIG. 5, a timer circuit is formed by a capacitor 108 and a discharge resistor 110 with a delay time being established by the time required for capacitor 108 to discharge through resistor 110 to a voltage below a trip point ($V_{REF}$) of a comparator 106. Capacitor 108 is normally charged from terminal 112 through diode 114 and resistor 116, the signal on terminal 112 being a positive voltage signal whenever the accelerator 34 is actuated. When accelerator 34 is released, terminal 112 is dropped to zero volts and capacitor 108 discharges through resistor 110 and diode 118 to a reference sink, i.e., zero volts at terminal 120. If the control system is in an automatic regeneration sensing mode but regenerative braking has not been initiated, the signal at terminal 120 is a logic 0 level and the field current $I_F$ is maintained at a minimum value, e.g., 4 amps, for enabling regenerative braking in response to an overspeed condition. If capacitor 108 discharges through resistor 110 before an overspeed condition is sensed, the comparator 106 will change state producing a logic 0 signal which will disable minimum field current. The concept is to minimize current consumption when the car is parked and not moving by allowing minimum field current to be dropped to zero. The time selected can be varied by changing the resistance 110 or capacitance 108 values or the value of $V_{REF}$ supplied to comparator 106 in such a manner as to assure that time-out will not occur in those instances in which the car is rolling downhill but takes a longer time, e.g., more than 20 seconds, to exceed the overspeed limit. In the event of an overspeed detection, an overspeed signal (OS) is applied through diode 102 and resistor 104 to charge capacitor 108 and prevent a time-out condition even though the accelerator is released. Further, once overspeed is detected and regenerative braking initiated, the signal at terminal 120 is changed to a logic 1 level to prevent discharge of capacitor 108.

In this embodiment, once the timer has been inactivated by discharge of capacitor 108 the timer will not be reactivated until the golf car is once again operated, that is, until the accelerator is again depressed. As will become apparent, if the operator actuates the accelerator after time-out, the system resets back to a minimum field current condition where regenerative braking can occur. It will be noted that if motor RPM at top speed on level ground is approximately 3000 RPM, there will be no overspeed detection and no retarding torque when the accelerator is fully depressed or released with the golf car traveling on a level surface if overspeed is set to trip for motor RPM at the above described 4000 RPM level.

Figure 7A:
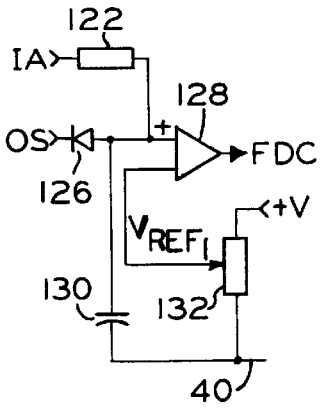
FIGS. 7A, 7B and 7C are simplified schematics of different forms of field current control circuits for use with the circuit of FIG. 5.

Once an overspeed condition has been detected, there are several ways in which to implement retarding torque so as to prevent the golf car from exceeding the mechanical breakdown speed of the motor. One implementation is shown in FIG. 7A in which the system monitors armature current and changes the field duty cycle so as to maintain a constant armature current and therefore a constant horsepower. In this implementation, the $I_A$ signal from amplifier 96 is coupled through a resistor 122 to a non-inverting input of a comparator 124. The overspeed signal (OS) is coupled to a cathode terminal of a diode 126 which is connected to the same input terminal of comparator 128. The diode is poled so that when the overspeed signal goes high indicating an overspeed condition, the input to the amplifier 128 becomes the value of armature current $I_A$ times the resistor value 122. An integrating and filter capacitor 130 is coupled to the non-inverting input of amplifier 128 and to the negative power line 40 to minimize current spikes. The inverting input terminal of comparator 128 is coupled to an adjustable arm on a potentiometer 132. Potentiometer 132 is connected between a voltage reference +V and return line 40. The output of comparator 128 then becomes the product of armature current $I_A$ times resistance 122 minus the reference voltage $VREF_1$ on the movable arm of potentiometer 132. By setting the value of $VREF_1$ from potentiometer 132, the field current can be adjusted so as to maintain a constant armature current and therefore a constant horsepower. While this provides a certain degree of retarding force, it will be noted that this system is not a speed regulator. On a steep hill, the golf car can still exceed the maximum allowable speed of about 16 miles per hour.

Figure 7B:
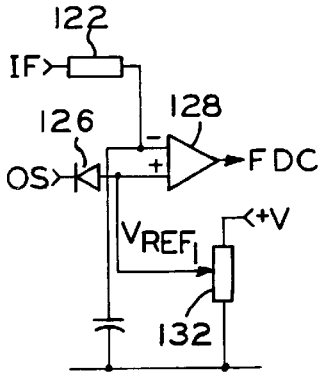

FIG. 7B shows the circuit of FIG. 7A but with the controlling input now being the sensed field current signal $I_F$. In this embodiment, the system implements variable horsepower with constant field current. The terminals of the comparator amplifier 128 are reversed so that the field current signal $I_F$ is fed into the inverting terminal and the reference voltage $V_{REF1}$ iS applied to the non-inverting terminal. The output signal from comparator 128 now becomes $V_{REF1}$ minus $I_F$ times the value of resistor 122. The result in this case will be a constant field current since the value for FDC will remain constant and the actual horsepower developed by the motor will be a variable. One advantage of this system is to allow the speed to be better controlled at a maximum value. For example, the value of the reference voltage can be set so that maximum speed is limited on a steep hill better than can be done in a constant horsepower mode.

Figure 7C:
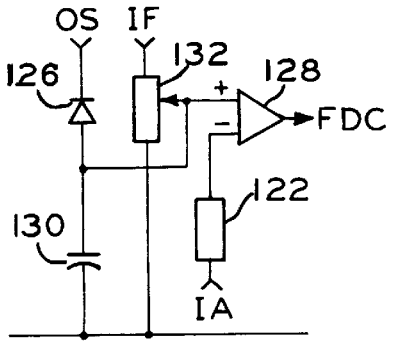

A still better form of control is shown in the modified circuit of FIG. 7C in which both the field current $I_F$ and armature current $I_A$ signals are applied to the comparator 128. The field current $I_F$ signal is applied to the potentiometer 132 in place of the fixed voltage signal +V. The armature current signal $I_A$ is then applied through resistor 122 to the inverting input of amplifier 128. The output of amplifier 128 now becomes the magnitude of the $I_F$ signal times the selected resistance value of potentiometer 132 minus armature current times the resistance of resistor 122, i.e., $FDC = I_F \cdot KR_{132} - I_A \cdot R_{122}$, where K represents the setting of potentiometer $R_{132}$. The circuit of FIG. 7C thus does a much better job of regulating motor speed than either FIG. 7A or 7B. However, the circuit of FIG. 7B does provide the variable horsepower approach so that the system will have increased electrical retarding on steeper hills. More particularly, a higher speed tends to generate more armature current so the retard force generated by the circuit will increase. However, the system still does not attempt to regulate motor speed. In contrast, FIG. 7C implements a system which does perform better regulation of motor speed since both $I_A$ and $I_F$ are used to control the torque produced by the motor during regenerative braking. It will be apparent that while the circuits of FIGS. 7A, 7B and 7C have essentially the same form, the values of the components, particularly the resistors, will vary between circuits. Also, the values of $I_A$ and $I_F$ are adjusted values from amplifiers 96, 78 and 76.

A problem discussed briefly above and related specifically to the use of separately excited electric shunt motors on golf cars is that a car left unattended on a steep hill may suddenly start moving and accelerating down the hill if the manual brake is not set or slips. In order to prevent this sudden acceleration and runaway condition, applicants have included a voltage sensor connected between terminals A1 and A2 of motor armature winding 42. If the golf car starts moving, the wheels will cause the armature to begin rotating and a small voltage will be generated between terminals A1 and A2 as a result of residual magnetism in the motor housing. The polarity of the voltage generated will be a function of two events, the first being the last direction in which the car was driven and the second being the direction, i.e., forward or reverse, in which the car is rolling down the hill. Accordingly, the system includes means for storing the last direction traveled. In the event that a voltage is sensed from terminals A1 to A2, the system will determine the polarity of the sensed voltage, determine the direction in which the car was last driven, the direction in which the car is rolling, i.e., forward or backward, and then implement plugging of the motor to prevent the runaway condition. In order to implement plugging, the system implements a field current in a direction to cause the motor armature 42 to generate a current which can be used to plug the motor by forcing a circulating current through the diode 48 and armature 42 with the resulting electric power being dissipated as heat in the motor armature winding 42. The magnitude of field current can be set under these conditions to limit the maximum speed of the golf car to some low value, for example, two miles per hour.

Figure 8:
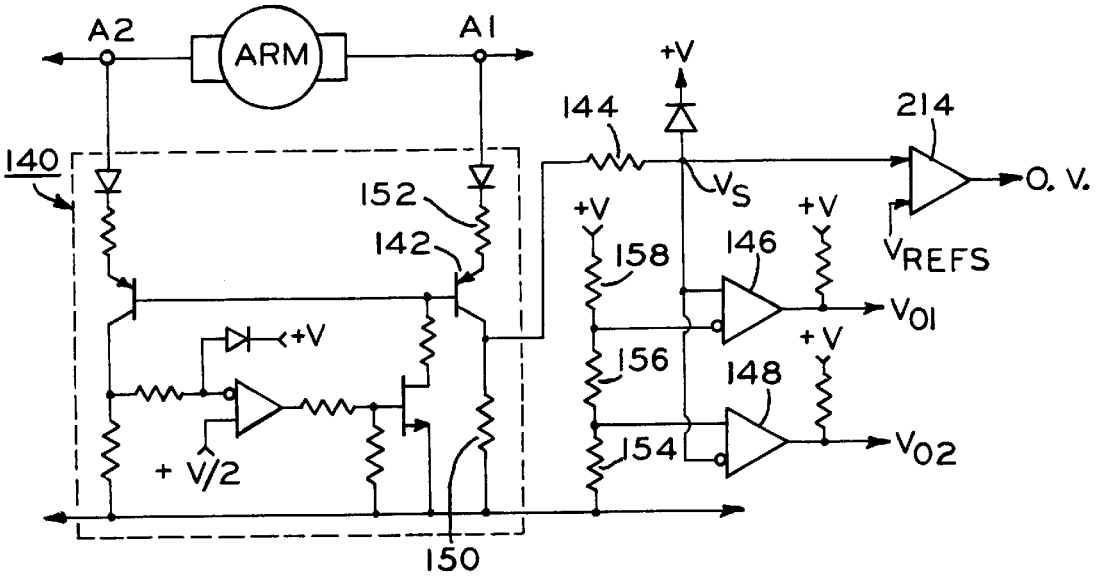
FIG. 8 is a schematic representation of a motor voltage detection circuit which senses motor rotation without motor energization.

Referring now to FIG. 8, one form of motor armature low voltage detector is shown as a conventional differential amplifier 140 having a pair of input terminals coupled to terminals A1 and A2 of armature winding 42. The output of amplifier 140 is developed at a collection terminal of a transistor 142 and is coupled through a resistor 144 to respective input terminals of a pair of comparators 146 and 148. The transistor 142 includes a collector resistor 150 and an emitter resistor 152, the values of which will become apparent. Each of the comparators 146 and 148 have second input terminals connected to reference voltages taken from a voltage divider comprising series connected resistors 154, 156 and 158. The circuit values are selected so that $V_{01}=V_{02}=0$ when the armature is not rotating. Note that the reference voltages are different for each comparator 146, 148. The comparators develop a pair of signals which not only detect rotation of armature 42 but also the direction of rotation. The amplifier 140 is biased so that output voltage $V_S$ is V/2 when the voltage $V_{A1}$ at terminal A1 equals the voltage $V_{A2}$ at terminal A2. Assuming that voltage +V is 5 volts, $V_S$=2.5 volts when $V_{A1}=V_{A2}$. When the voltage at terminal A1 exceeds the voltage at A2 by a preselected value, the output of comparator 146 becomes high. If the voltage at A1 is less than that at A2, the output of comparator 148 becomes high. Again assuming +V=5 volts, if $V_{A1}$ is greater than $V_{A2}$ by, for example, 35 millivolts, $$V_S = 2.5 + \frac{(.035)R_{150}}{R_{152}} = 2.85 \text{ volts}$$

and $V_{01}$=5 volts. If $V_{A2}$ is greater than $V_{A1}$, then $$V_S = 2.5\frac{(.035)R_{150}}{R_{152}} = 2.15 \text{ V}$$

and $V_{02}$=5 volts.

If the last sensed direction of rotation is a forward direction (which creates a residual magnetism in the motor 28 in a fixed polarity), subsequent rotation of armature 42 without motor energization will cause the generated armature voltage (A1 to A2) to assume a specific polarity for a specific direction of rotation. If the last direction was reverse, the same event occurs but with opposite polarity. Assuming, for example, that A2 becomes positive with respect to A1 if the car starts rolling downhill in a forward direction after last being operated in a forward direction, such rolling would result in voltage $V_{02}$ going high. Conversely, if the car begins rolling downhill in a reverse direction, under the same pre-existing conditions, voltage $V_{01}$ would become high. Given this information, the control system can then energize field winding 52 with a polarity so as to cause motor current $I_A$ to circulate through diode 48 and plug brake the motor. The signals $V_{01}$ and $V_{02}$ are coupled to a logic circuit 160 (see FIG. 9) which determines whether to implement plug braking since such braking is not desired when an operator is on the golf car.

The system of FIG. 8 can also be used to implement regenerative braking in response to an overspeed condition and eliminate the timer described with regard to FIG. 5. If the golf car is being driven (accelerator actuated) downhill, the circuit of FIG. 5 will detect an overspeed condition and will cause an immediate transition to regenerative braking by generating the OS signal. If the golf car is being allowed to coast downhill, i.e., accelerator released, the system of FIG. 5 will still produce the OS signal and will transition to regenerative braking in the same manner. The purpose of the timer is to terminate $I_{FMIN}$ after a time interval so that excess battery power is not wasted if the golf car is parked. If the timer is eliminated, $I_{FMIN}$ can be allowed to go to zero as soon as the golf car stops. The circuit of FIG. 8 provides a method for detecting a stopped car, i.e., if $V_{01}=V_{02}=0$. Whenever this stopped condition is detected, the system is reset to implement plugging if a motor voltage is subsequently detected without the accelerator being actuated. If the accelerator is actuated, the system inhibits plug braking until the car is again stopped. More particularly, depressing the accelerator provides a signal to circuit 160 (FIG. 9) which inhibits plug braking (the "PLUG" signal) until reset by the $V_{01}/V_{02}$ signals transitioning to a logic 0 thereby indicating that motor rotation is zero. Thereafter, any rotation of motor armature 42 sets $V_{01}$ or $V_{02}$ to a logic 1 which implements plug braking. Plug braking is then disabled by depression of the accelerator, i.e., a NOT NEUT (non-neutral) condition. An advantage of this arrangement is that overspeed occurring after the preselected time will still be detected.

Figure 9:
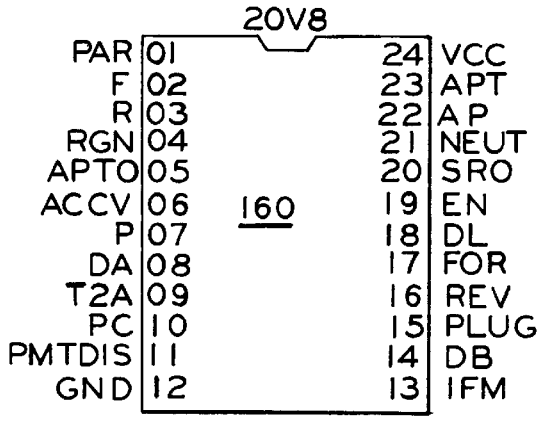
FIG. 9 is an illustration of a gate array logic block with signal lines useful in understanding the logic of Table 1.

Referring to FIG. 9, there is shown a simplified representation of a logic circuit for use with the present invention for determining when to implement the braking functions. The circuit includes a logic device 160 which may be a gate array logic device or a microcomputer. Preferably, the device 160 is implemented as a programmable logic array such as a National Semiconductor Corp. type 20V8. The logic functions implemented in device 160 are set forth in the following table:

TABLE I

```
FOR
  =   F & !R & T2A & !REV & !SRO
  |   F & !R & !REV & FOR & !SRO
  |   DL & !APT
  |   !DA & DB & DL & EN
  |   DA & !DB & !DL & EN
  |   DB & FOR & EN;
REV
  =   !F & R & T2A & !FOR & !SRO
  |   !F & R & REV & !FOR * !SRO
  |   !DL & !APT
  |   DA & !DB & DL & EN
  |   !DA & DB & !DL & EN
  |   DB & REV & EN;
 EN
  =   !DA & !DB & !NEUT
  |   EN & !NEUT;
 DL
  =   F & PC
  |   !PC & DL
  |   !R & P & DL;
!PLUG
  =   R & DL
  |   F & !DL;
!SRO
  =   PAR & ACCV & T2A
  |   PAR & F & !SRO
  |   PAR & R & !SRO
  |   PAR & !APT
  |   PAR & !P
  |   PAR & PMTDIS & SRO;
!NEUT
  =   !PAR
  |   !P & !PC
  |   !F & !R
  |   SRO;
 !AP
  =   !F & !R & APTO & !NEUT
  |   RGN & !APT
  |   RGN & !APT;
```

The following listing defines the terms used in the logic Table 1:

| INPUTS | |
|---|---|
| PAR; | 0 = POWER APPLIED RESET PULSE |
| F; | 1 = FORWARD SW CLOSED |
| R; | 1 = REVERSE SW CLOSED |
| RGN; | 1 = RGN (OS) |
| APTO | 0 = AP TIMED OUT |
| ACCV | 1 = ACC VOLTS >= 3 VOLTS |
| P | 0 = PLUG |
| DA | 1 = ARM MOTION A1 > A2 |
| T2A | 1 = T2 ARM |
| PMTDIS; | 1 = PMT DISABLE |
| GND; | |
| IFM; | 1 = FIELD MIN CURRENT EST |
| DB; | 1 = ARM MOTION A1 > A2 |
| PC; | 1 = CANCEL PLUG |
| APT; | 0 = AP (TIED TO PIN 22) |
| OUTPUTS | |
| PLUG; | 0 = PLUG ENABLE |
| REV; | 1 = ENABLE REVERSE DRIVER |
| FOR; | 1 = ENABLE FORWARD DRIVER |
| EN; | 1 = ENABLE KACHUNK |
| DL; | 1 = LATCH F 0 = LATCH R |
| SRO; | 0 = NEUT/PMT CHECKS SATISFIED |
| NEUT; | 0 = NEUT CONDITION |
| AP; | 0 = AP ENABLE AUTO REGEN (MIN IF) |
| VCC; | |

The logic Table I fully describes the logic functions implemented by gate array logic 160. As an example, the output signal FOR, which is the signal indicating forward direction of the golf car is selected and which signal is supplied to the field winding PWM circuit, is produced if any one of the listed statements is true. The first statement says that forward (F) is selected, reverse (R) is not selected, the armature switch T2A (MOSFET 44) is not shorted, a reverse output (REV) is low and a safety check (SRO) indicates no errors. Once the signal FOR is produced, the remaining statements provide logic rules for maintaining the signal. Considering the statement !DA & DB & !DL & EN, which occurs during plug braking, FOR is produced if the car is not moving in direction A (DA), is not moving in direction B (! DB), direction latch (DL) is set to logic 0 (reverse) and EN is high. Each of the terms of Table I are defined in the listing following the Table. Note that DA correspond to $V_{01}$ and DB corresponds to $V_{02}$ in the disclosed implementation.

Figure 10:
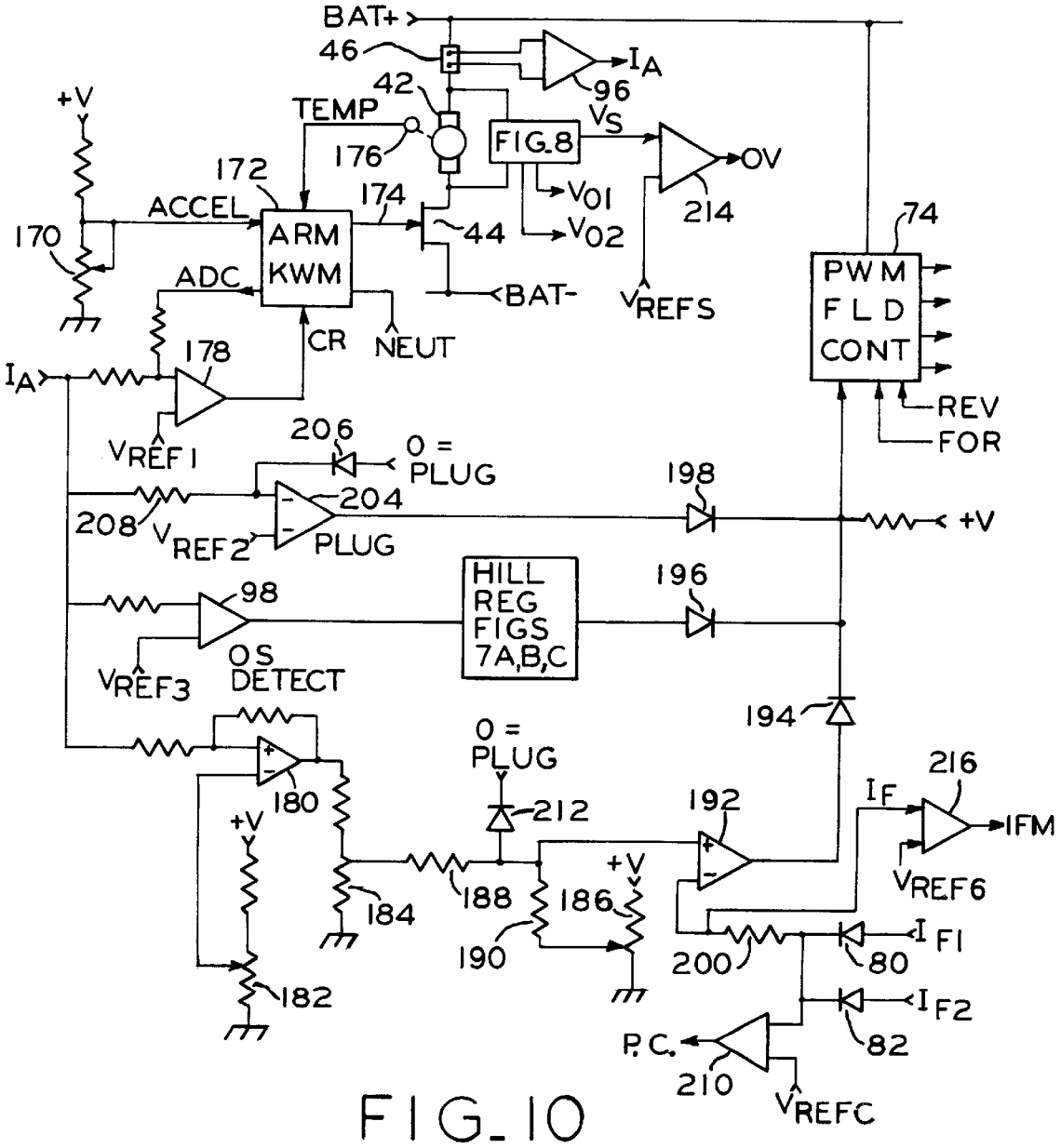
FIG. 10 is a simplified schematic representation of a golf car control system in accordance with the present invention and showing interface between the circuits of FIGS. 5–9.

Turning now to FIG. 10, there is shown a simplified block diagram of an overall system for a golf car incorporating the features described thus far. FIG. 10 illustrates how the various sub systems can be combined into a single system for controlling the golf car of FIG. 2. The accelerator 34 is connected to an apparatus for providing a variable voltage input such as the illustrated potentiometer 170 in FIG. 10. The output of the potentiometer 170 is coupled into an armature pulse width modulation circuit 172 of a type well known in the art. Essentially, the circuit 172 provides a pulse width modulated control signal via line 174 to MOSFET 44 wherein the percent on-time of the signal of MOSFET 44 is a function of the position of potentiometer 170. However, there are several conditions which can limit the operation of PWM circuit 172. One example is a temperature sensor 176 which senses the temperature of motor armature 42 and provides a signal to the circuit 172 if the temperature exceeds a preselected maximum value. This circuit is typically referred to as an over-temperature circuit and serves to actually terminate operation of the PWM circuit so that the armature current MOSFET 44 is disabled. Motor temperature monitors are well known in the art and any of several well known types can be used in this application to provide an overtemperature signal. Another signal which can disable the armature PWM circuit 172 is a neutral signal NEUT which is generated by the programmable gate array logic 160 of FIG. 9. The neutral signal occurs under several conditions including a condition in which the forward/reverse direction switch is not placed in a forward or reverse direction position, i.e., no direction is selected. The neutral signal is also generated when a plug brake mode or regenerative braking mode is initialized by the control system, i.e., RGN or PLUG active. Still another limit on the pulse width modulation armature circuit 172 is a current limit signal (CL) which limits the maximum allowable current as a function of the percent on-time of the MOSFET 44. In this respect, an armature duty cycle (ADC) signal is summed with the armature current signal $I_A$ at an input terminal of an amplifier 178. The output of the amplifier 178 is the current limit signal (CL) which is applied to the armature circuit 172 to limit the percent on-time of the MOSFET 44 at high current levels. For example, the percent on-time of MOSFET 44 can be set such that the MOSFET is allowed to be 100% conductive at 300 amps of armature current and tapers off to zero percent conduction at 400 amps of armature current.

The PWM field control circuit 74 is controlled by one of three optional signals generated by the control system. One signal is used during normal operation, another signal is used during regenerative braking and a third signal is used when the system is in a plug mode. Considering the normal operation, the armature current signal $I_A$ is coupled to a non-inverting input of a differential amplifier 180. The inverting input of amplifier 180 is connected to a variable position arm of a potentiometer 182. As will we recall from the discussion with respect to FIG. 4, the initial operation of the system anticipates a minimum field current out to a point A which generally corresponds to a motor stability point. However, the point A can be moved in by the control system so that the system never reaches the motor stability point. Adjustment of the point A in FIG. 4 is achieved by adjustment of the potentiometer 182 to vary the $I_A$ current level at which amplifier 180 begins to provide an output voltage proportional to the magnitude of the $I_A$ signal. The output of the amplifier 180 is connected to supply another potentiometer 184 which sets the slope of the curve above the motor stability point of FIG. 4. More particularly, by adjusting potentiometer 184, one can select the normal response characteristic of line 36 or select another response characteristic such as those illustrated by lines 35 and 37 to produce higher torque with less speed or more speed with lower torque.

The output of the amplifier 180 is normally zero volts until the $I_A$ signal applied to the noninverting input terminal exceeds the voltage reference set by potentiometer 182. During the time that the output of amplifier 180 is at zero volts, the field current is set by potentiometer 186. The movable arm of potentiometer 186 is connected to the movable arm of potentiometer 184 through appropriate resistances 188 and 190. The potentiometer 186 actually sets the minimum field current and supplies a signal to the amplifier 192. The output of amplifier 192 is connected to an OR circuit comprising the diodes 194, 196 and 198. The OR circuit allows the highest or most positive input signal as the control signal to supply to the field control circuit 74 as the field duty cycle (FDC) signal. The output of amplifier 192 is connected through diode 194 to the FDC input of field control circuit 74.

A second input terminal of amplifier 192 is connected to receive the field current feedback signals IF1 and IF2 through the previously described OR circuit comprising diodes 80 and 82, which diodes are shown in FIG. 5. As previously discussed, only one of the signals IF1 and IF2 will be active at any one time. This signal is fed through the corresponding diodes 80,82 and a series resistor 200 into the inverting input terminal of amplifier 192. The summation of the minimum field current signal from potentiometer 186 and the armature current signal from potentiometer 184 is then summed with the field current feedback signal to provide the field control duty cycle signal in the form of a feedback control loop based on comparing armature current to field current, although the initial control loop regulates field current to the selected $I_{FMIN}$. As discussed previously, the armature current and field current are related and the circuit described beginning with amplifier 180 and amplifier 192 provide the relationship between armature current and field current.

The hill sensing regenerative braking circuit discussed previously with regard to FIG. 5 also utilizes the armature current signal $I_A$ to detect an overspeed condition and to implement one of the regenerative braking control schemes illustrated in FIGS. 7A, 7B and 7C. The choice of control scheme depends upon the particular desired characteristic response which may depend on the "hilliness" of a course. The signal from the selected one of the circuits of FIGS. 7A, 7B and 7C is coupled through the diode 196 as the field duty cycle control. If necessary, the FDC signal can be used to control an oscillator 94 as shown in FIG. 6 with the oscillator output being coupled to the PWM field control 74. In this regard, the $I_A$ signal is applied to an overspeed detection circuit comprising a comparator 98. It will be recognized that during normal motoring conditions, the signal $I_A$ will have a first polarity. During regenerative braking, the signal $I_A$ will reverse polarity since current through the armature is flowing in an opposite direction. The comparator 98 is set to detect the reverse polarity of the $I_A$ signal when it exceeds a predetermined reference value set by the signal $V_{REF3}$. It will be appreciated that the $I_A$ signal developed by the amplifier 96 is a voltage signal and can be set to have any particular value by adjustment of the amplifier 96. In an exemplary embodiment, the $I_A$ signal is set to have a value of two volts at zero amps so that if the value of $I_A$ falls below two volts, there will be an indication that the armature current has reversed direction and the system is operating in a regenerative braking mode. In this example, the $V_{REF}$ signal can be set at 1.9 volts so that when IA falls below 1.9 volts, the comparator 98 will change state and apply an overspeed (OS) signal to the hill regeneration circuits of FIGS. 7A, 7B, and 7C. In this instance, the OS signal enables one of the hill regeneration circuits and that signal is then applied through the diode 196 to the field control circuit 74. The third operating mode of the inventive system is a plug mode which is implemented to prevent a runaway condition on an unoccupied golf car. In this instance, the $I_A$ signal is applied to a comparator 204 where it is compared to a reference signal $V_{REF2}$. The comparator 204 is normally disabled by a plug signal applied through diode 206 from the programmable gate array logic 160 of FIG. 9. The logic for generating the plug signal is set forth in Table I. If plug is enabled, the programmable gate array logic 160 applies a logic zero signal to the diode 206 thereby enabling comparator 204 and the armature current signal $I_A$ applied through resistor 208 to the inverting input terminal becomes the controlling signal. If the armature current signal exceeds the value of the $V_{REF2}$ voltage, the output of comparator 204 will become high forcing a current through diode 198 and into the field duty cycle control input of field circuit 74. The effect will be to drive field current to a very high value and generate large amounts of torque so as to brake the golf car to a very low speed, such as, for example, the previously mentioned two miles per hour. The more torque that is required in order to maintain this low speed, the higher the field current will be driven. If the speed drops down to below the set limit of, for example, two miles per hour, the field current may be driven excessively high in trying to create sufficient armature current to maintain braking. Carried to extremes, if the golf car comes to a stop, the field current would be in a maximum current condition. In this instance, it is desirable to disable the plug mode since the vehicle is now stopped. One method for doing this is to monitor the field current with another comparator 210 which compares the field current from one of the diodes 80 or 82 to another voltage reference $V_{REF4}$ and provides a signal when the field current exceeds the set reference value. The signal is identified as a plug cancel (PC) signal and is applied from amplifier comparator 210 to the programmable gate array logic 160. It will also be noted that a PLUG signal is applied to the input of the amplifier 192 through a diode 212. In the plug mode, the programmable gate array logic outputs a logic zero to indicate that the system is in plug. When this occurs, the PLUG signal applied to the input of amplifier 192 pulls that input down so that the output of amplifier 192 no longer affects the field duty cycle control.

As can be appreciated from a review of FIG. 10, the golf car system has three modes of operation: (1) a normal mode in which armature current and field current are controlled with respect to each other by use of the accelerator on the golf car; a first overspeed condition in which the car is occupied and the system reverts to a regenerative braking mode to limit the maximum speed to some preselected value such as, for example, 16 miles per hour; and (3) a protection mode to detect a runaway ear condition when the car has been parked and inadvertently starts to move without an operator aboard. In this latter condition, the system detects rotation of the motor armature and initiates a plug braking mode which limits speed of the vehicle to a much lower value such as, for example, two miles per hour.

One further feature which has not yet been discussed is the detection of an over voltage condition which may occur during the regenerative braking mode. In some older cars, the battery pack may become corroded at the terminals so that a substantial resistance appears when the system is in a regenerative braking mode and current is being supplied from the motor armature to the battery pack. Since the control system as described above regulates on current, the regenerative voltage of the armature can substantially exceed the battery voltage. In some instances, this voltage may become sufficiently high to cause damage to the control system or to the armature itself. Accordingly, the signal $V_S$ shown as the differential amplifier output in FIG. 8 is coupled to a comparator 214 where it is compared to another voltage reference signal $V_{REF5}$. If the magnitude of $V_S$ exceeds the reference signal, an over voltage signal is generated which is applied to the programmable gate array logic 160 to initiate a shut down of the system. Still another feature of the present invention is a minimum field current detection circuit which prevents operation of switch 44 ($I_A$ control) until at least the minimum field current exists in field winding 52. Again referring to FIG. 10, the $I_F$ signal is coupled to a comparator 216 where it is compared to a voltage reference $V_{REF6}$. If $I_F$ reaches the minimum field current value (set by $V_{REF6}$), comparator 216 provides an IFM signal to gate array logic 160 which then enables armature PWM circuit 172. This circuit prevents the application of battery voltage across armature 42 until minimum field current is established and prevents damaging the armature winding by excess current. The armature winding 42 has very low resistance and could draw enough current to either damage the armature or burn out switch 44 if field current isn't present.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. [A golf car] *An electrically powered vehicle* having at least one driven wheel [and adapted for carrying at least one person and golf equipment on a golf course, the golf car including] *the vehicle including*:

a direct current electric drive motor having a separately excited field winding and a separately excited armature winding;

a battery for supplying direct current electric power to said drive motor;

[a foot operated] an accelerator for selectively establishing the speed of said vehicle between zero velocity and a preset maximum vehicle speed;

control means interconnecting said battery to said drive motor, said control means included:

(i) first current sensing means for sensing the magnitude of current in said armature winding;

(ii) second current sensing means for sensing the magnitude of current in said field winding;

(iii) switching means connected in series with each of said armature winding and said field winding;

(iv) a logic control coupled to supply signals to said switching means in response to said accelerator for establishing a current through each of said armature winding and said field winding at a magnitude to cause said motor to accelerate said [golf car] *vehicle* to a speed corresponding to accelerator position, said logic control receiving signals from said first and second current sensing means and being responsive thereto for initiating electrical retarding of said [golf car] *vehicle* when current through said armature winding reverses direction.

2. The [golf car] *vehicle* of claim 1 wherein said control means includes means for maintaining a minimum field current for a preselected time interval after said accelerator is returned to a zero velocity position and for initiating electrical retarding of said [golf car] *vehicle* upon detection of armature winding current reversal during said interval.

3. The [golf car] *vehicle* of claim 1 wherein said control means regulates a constant armature winding current during electrical retarding of said [golf car] *vehicle*.

4. The [golf car] *vehicle* of claim 1 wherein said control means regulates a constant field current during electrical retarding of said [golf car] *vehicle*.

5. The [golf car] *vehicle* of claim 1 wherein said control means regulates field current in direct proportion to armature winding current during electrical retarding of said [golf car] *vehicle*.

6. A method for preventing overspeed of an electrically powered [golf car] *vehicle*, said [golf car] *vehicle* including a shunt wound direct current electric motor having an armature winding and a field winding, each of said armature winding and said field winding being serially connected to respective switching means and to a source of on-board direct current electric power, said [golf car] *vehicle* further including control means adapted and connected to regulate the current in each of said armature and field windings for controlling the speed of said [golf car] *vehicle* in response to an operator's command, the [golf car] *vehicle* being subject to overspeed when running downhill, the method comprising the steps of:

sensing the magnitude of current in each of the armature winding and the field winding;

detecting when the current in the armature winding reverses direction;

comparing the magnitude of the armature winding current during reversal thereof to a preselected value and providing an overspeed signal when the reverse current magnitude exceeds the preselected value; and controlling the field current, in response to the overspeed signal, to limit the speed of the [golf car] *vehicle* to inhibit the overspeed condition.

7. The method of claim 6 wherein the step of controlling includes the step of regulating the field winding current to establish a constant armature winding current.

8. The method of claim 6 wherein the step of controlling includes the step of regulating the field winding current to a constant preselected value.

9. The method of claim 6 wherein the step of controlling includes the step of regulating the field winding current to a value directly proportional to the value of armature winding current.

10. The method of claim 6 and including the steps of:

monitoring voltage at the motor armature winding during a time period when the motor is in a non-energized condition and providing a motion signal indicative of motor armature rotation upon detection of a motor armature winding voltage;

energizing the motor field winding, in response to the motion signal, with a voltage of a polarity for generating a field current to cause the motor to act as an electric current generator; and circulating the current generated by the motor armature through a plugging diode and into the motor armature for electrically retarding rotation of the motor armature by plug braking.

11. The method of claim 10 and including the step of storing, for each incidence of operation of the [golf car] *vehicle*, the direction of rotation of the motor for use in determining the direction of rotation of the motor during the non-energized time period.

12. The method of claim 6 and wherein the step of controlling the field current includes the step of operating the control means to affect regenerative electrical braking of the [golf car] *vehicle*.

13. The method of claim 12 and including the steps of, during regenerative braking, detecting a voltage at said armature greater than a maximum allowable voltage and disabling regenerative braking when said armature voltage exceeds said maximum allowable voltage.

14. The method of claim 10 and including the step of, during plug braking, terminating plug braking when motor field current exceeds a predetermined maximum value.

15. The method of claim 8 and including the step of establishing a minimum field current to establish a desired operating characteristic.

16. The method of claim 15 and including the step of establishing a selected relationship between field current and armature current for field current greater than the minimum field current.

17. The method of claim 16 and including the step of inhibiting establishment of armature current until field current reaches the minimum field current.

18. The method of claim 10 and including the step of disabling plug braking when motor field current exceeds a selected maximum magnitude.

19. A method for controlling operation of an electrically powered [golf car] *vehicle*, said [golf car] *vehicle* having a shunt wound separately excited electric motor having an armature winding and a field winding and further having an accelerator for selecting a desired speed of operation of the [car] *vehicle*, the [car] *vehicle* being operative in one of a motoring, a regenerative electrical braking and an electrical plug braking mode at any one time, the method comprising the steps of:

responding, by a motor control system, to accelerator position by applying electric power to the motor to affect motion of the [golf car] *vehicle*;

detecting an overspeed condition of the [golf car] *vehicle* subsequent to the step of affecting motion thereof and enabling regenerative braking of the [car] *vehicle*; and detecting motion of the [car] *vehicle* prior to actuation of the accelerator and the step of affecting motion thereof and enabling plug braking of the [car] *vehicle*.

20. The method of claim 19 and including the step of disabling plug braking by actuating the accelerator.

* * * * *